United States Patent [19]

Romberger et al.

[11] Patent Number: 5,230,833

[45] Date of Patent: Jul. 27, 1993

[54] LOW SODIUM, LOW METALS SILICA POLISHING SLURRIES

[75] Inventors: John A. Romberger, Oak Park; Charles C. Payne, Aurora, both of Ill.

[73] Assignee: Nalco Chemical Company, Naperville, Ill.

[21] Appl. No.: 932,284

[22] Filed: Aug. 19, 1992

Related U.S. Application Data

[63] Continuation of Ser. No. 706,321, May 28, 1991, abandoned, which is a continuation-in-part of Ser. No. 420,786, Oct. 12, 1989, abandoned, which is a continuation-in-part of Ser. No. 406,171, Sep. 12, 1989, abandoned, which is a continuation-in-part of Ser. No. 363,834, Jun. 9, 1989, abandoned.

[51] Int. Cl.$^5$ .......................... B24B 1/00; C09G 1/02
[52] U.S. Cl. ........................ 252/363.5; 252/313.2; 51/283 R; 51/308
[58] Field of Search .............. 252/363.5, 313.2; 51/283 R, 308

[56] References Cited

U.S. PATENT DOCUMENTS

| | | | |
|---|---|---|---|
| 2,801,216 | 7/1957 | Yoder et al. | 210/64 |
| 2,823,186 | 2/1958 | Nickerson | 252/313 |
| 3,024,089 | 3/1962 | Spencer et al. | 23/182 |
| 3,046,234 | 7/1962 | Roman et al. | 252/313 |
| 3,148,110 | 9/1964 | McGahen | 167/26 |
| 3,336,236 | 8/1967 | Michalski | 252/313 |
| 3,377,275 | 4/1968 | Michalski et al. | 210/64 |
| 3,816,330 | 6/1974 | Havens | 252/313 S |
| 3,860,431 | 1/1975 | Payne et al. | 106/36 |
| 4,169,337 | 10/1979 | Payne | 51/308 X |
| 4,462,188 | 7/1984 | Payne | 51/308 X |
| 4,588,421 | 5/1986 | Payne | 51/308 |
| 4,624,800 | 11/1986 | Sasaki et al. | 252/313.2 |
| 4,664,679 | 5/1987 | Kohyama et al. | 106/287.34 X |
| 4,892,612 | 1/1990 | Huff | 51/283 R X |

OTHER PUBLICATIONS

Iler, "The Chemistry of Silica", Wiley Interscience, 1979, p. 359.

Stober et al., "Controlled Growth of Monodisperse Silica Spheres in Micron Size Range", Journal of Colloid & Interface Science, 26, 61-69 (1968).

Wagner et al., "Aerosil, Herstellung, Eigenschaften und Verhalten in orgnaischen Flussigkeiten", Angew. Chem., 72, 1960, Nr 19/20.

Aulich et al., "New Methods to Prepare High-purity Silica", Journal of Materials Science, 19(1984) 1710-1717.

Primary Examiner—Gary Geist
Attorney, Agent, or Firm—Ailes, Ohlandt & Greeley

[57] ABSTRACT

A colloidal silica slurry comprising: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm, based on $SiO_2$; potassium, as K, present in an amount less than about 25 ppm, based on $SiO_2$; and sodium, as Na, present in an amount less than about 500 ppm, based on $SiO_2$; and a bactericide, a polishing rate accelerator which differs from the bactericide, and/or a sodium chlorite or sodium hypochlorite biocide. Optionally, a fungicide may also be added to the colloidal silica slurry to inhibit fungi growth.

54 Claims, No Drawings

LOW SODIUM, LOW METALS SILICA POLISHING SLURRIES

This is a continuation of application Ser. No. 07/706,321, filed May 28, 1991, now abandoned, which is a continuation-in-part of application Ser. No. 07/420,786, filed Oct. 12, 1989, now abandoned, which is a continuation-in-part of application Ser. No. 07/406,171, filed Sep. 12, 1989 now abandoned which is a continuation-in-part of application Ser. No. 07/363,834, filed Jun. 9, 1989, now abandoned.

The present invention provides novel colloidal silica slurries having a low sodium and metal content which are particularly useful in the polishing of silicon wafers or substrates. Silicon wafers are basic components of integrated circuits, semiconductors devices, and transistors.

BACKGROUND OF THE INVENTION

Rough cut silicon wafers normally require polishing before they are acceptable for use in electronic devices. Silica polishing is a conventional method for the fine surface polishing of silicon wafers. This method involves positioning the wafer on a polishing head which is then positioned above a rotating polishing plate. The polishing plate is covered with a polishing pad (i.e., a composite pad with a polymeric material) and is held there with an adhesive. During polishing, dilute colloidal silica is continuously injected between the polishing plate and the silicon wafer for fine polishing of the wafer.

The electrical performance of finished semiconductor chips can easily be affected by contaminants acquired by the wafers during processing. Such contamination can be in the form of discrete particles and water soluble or dispersed organic and inorganic impurities. That is, the use of silica sols that are contaminated with trace transition metals, alkali and alkaline earth metals, aluminum, and the like have caused difficulties especially when used in wafer polishing.

These contaminating metals are particularly a nuisance when they include Na, K, alkali and alkaline earth metals such as Ca, Mg, and transition metals such as Fe, Cu, Mn, Ni, Zn, and the like. In general, any transition metal from groups IB, IIB, IIIB, IVB, VB, VIB, and group VIII of the Periodic Table of Elements, if present in high enough concentrations, can cause difficulties in the final products manufactured with silica sols containing these contaminants.

Another metal which can cause difficulties, particularly in the manufacture of certain catalysts, is aluminum. If aluminum is present, and particularly if Fe, Ni, Cu, Mn, or Cr are also present, the silica sols often cannot meet the requirements for the final product, whether those requirements include catalysts, in refractories, in investment casts, or in electronic polishing agents used for electronic wafers.

Alkali metals like lithium, sodium, and potassium demonstrate shifts in electrical properties (threshold and flat-band voltages) when incorporated into semiconductor devices. Heavy metals, such as copper, gold and iron, tend to lower minority carrier lifetime, while increasing dark and leakage currents. Tin, nickel and chromium behave similarly except that they also exhibit a lower oxide breakdown voltage.

Even anions like chloride have a detrimental effect on electrical properties through the process of gettering (concentrating) of the heavy metals and the complexing of the alkali metals.

An additional problem of metal contaminants is that many of these substances have much higher diffusivities in both silicon and silicon dioxide than do the more conventional dopants, such as phosphorus and boron. As a result unpredictable electrical properties can exist.

The effect of metal contaminants on silicon wafers has been widely reported in the following articles: Hiramoto et al., "Degradation of Gate Oxide Integrity by Metal Impurities," *Japanese Journal of Applied Physics, Part 2 (Letters)*, Vol. 28, No. 12, pp. 2109-11 (December 1989); Seibt et al., "TEM Study of Metal Impurity Precipitates in the Surface Regions of Silicon Wafers," Defects in Electronic Materials Symposium, *Mater. Res. Soc.*, Pittsburgh, Pa., pp. 215-18 (Nov. 30-Dec. 3, 1987); Hourai, et al., "A Method of Quantitative Contamination with Metallic Impurities of the Surface of a Silicon Wafer," *Japanese Journal of Applied Physics, Part 2 (Letters)*, Vol. 27, No. 12, pp. 2361-3 (December 1988); Corradi et al., "Surface Contamination Detection Below the ppb Range on Silicon Wafers," *Journal of Crystal Growth*, Vol 89, No. 1, pp. 39-42 (June 1988); Takizawa et al., "Degradation of Metal-Oxide-Semiconductor Devices Caused by Iron Impurities on the Silicon Wafer Surface", *Journal of Applied Physics*, Vol. 62, No. 12, pp. 4933-5 (Dec. 15, 1987): Honda et al., "Catastrophic Breakdown in Silicon Oxides: the Effect of Fe Impurities a the $SiO_2$-Si Interface," *Journal of Applied Physics*, Vol. 62, No. 5, pp. 1960-3 (Sep. 1, 1987); K. Graff, "Transition Metal Impurities in Silicon and Their Impact on Device Performance," SEMICON/EUROPA 1983, *Semiconductor Equipment & Material Institute*, Mountain View, Calif., pp. 9-19, (Mar. 8-10, 1983); P.J. Ward, "A Survey of Iron Contamination in Silicon Substrates and its Impact on Circuit Yield," *Journal of the Electrochemical Society*, Vol. 129, No. 11, pp. 2573-6 (November 1982); and Pearce et al., "Role of Metallic Contamination in the Formation of 'Saucer' Pit Defects in Epitaxial Silicon," *Journal of Vacuum Science and Technology*, Vol. 14, No. 1, pp. 40-3 (January-February 1977).

It is therefore critical to minimize the possibility of metal contamination in or on the silicon wafer prior to device manufacturing. One concern of semiconductor manufacturers is that colloidal silica containing metals will contaminate the wafer surface. Therefore, it is extremely desirable that colloidal silica products be formed with low sodium and metals content.

The preparation of low sodium, low metals silica is well-known. Various attempts have been made to reduce or eliminate sodium and/or metals from the silica source. A few examples are given in U.S. Pat. No. 4,624,800 (Sasaki et al.), issued Nov. 25, 1986; U.S. Pat. No. 3,024,089 (Spencer et al.), issued Mar. 6, 1962; Japanese Patent Application No. 88/285112 (Watanabe et al.), filed Nov. 22, 1988; Stober and Fink, "Controlled Growth of Monodisperse Silica Spheres in the Micron Size Range", *Journal of Colloid and Interface Science*, Vol. 26, 1968, pp. 62-69; Wagner and Brunner, "Aerosil, Herstellung, Eigenschaften und Verhalten in Organischen Flussigkeiten", *Angew. Chem.*, Vol. 72, No. 19/20, 1960, pp. 744-750; and Iler, "Chemistry of Silica", *Wiley Interscience*, 1979, p. 359.

The Sasaki et al. patent discloses a method for producing an aqueous low alkali-metal, low alumina silica sol by treatment of a powder silica with acid to remove the metals while applying ultrasonic vibrations. Spencer discloses a process for preparing finely divided metallic oxides by hydrolyzing a compound containing the corresponding metal while in contact with a finely divided carbonaceous carrier on which the oxide is deposited and then separating the oxide from the carbon.

The Stober article discloses a system of chemical reactions which permit the controlled growth of spherical silica particles of uniform size by means of hydrolysis of alkyl silicates and subsequent condensation of silicic acid in alcoholic solutions. Ammonia is used as a morphological catalyst.

Low sodium silica sol products, with or without low metal content, can also be prepared by removal of the counterions using ion exchange and then backadding ammonium hydroxide and ammonium carbonate to form stable products according to the Iler article.

Although colloidal silica is normally used in a once through polishing system, the cost of the silica and chemicals admixed therewith have caused an increased interest in the development of commercially acceptable recirculation systems. Recirculation systems provide fast polishing rates without high temperatures, avoid wafer warping, and substantially reduce the chemical cost of the polishing step. Unfortunately, when colloidal silicas, with or without organic accelerators, are placed in service for prolonged periods of time they exhibit increased microorganism and fungi growth. Bacterial contamination causes discoloration, odors, and makes the colloidal silica unacceptable as a polishing aid in wafer production.

Microorganism and fungi growth in colloidal silica are well known. Various attempts have been made to reduce or eliminate bacterial growth in colloidal silica. A few examples are shown in: U.S. Pat. Nos. 3,336,236 (Michalski), issued Aug. 15, 1967; 3,816,330 (Havens), issued Jun. 11, 1974; 3,860,431 (Payne), issued Jan. 14, 1975; 2,823,186 (Nickerson), issued Feb. 11, 1958; 2,801,216 (Yoder et al.), issued Jul. 30, 1957; 3,046,234 (Roman et al.), issued Jul. 24, 1962; 3,377,275 (Michalski et al.), issued Apr. 9, 1968; 3,148,110 (McGahen), issued Sep. 8, 1964; 4,169,337 (Payne), issued Oct. 2, 1979; 4,462,188 (Payne), issued Jul. 31, 1984; 4,588,421 (Payne), issued May 13, 1986; 4,892,612 (Huff), issued Jan. 9, 1990; and 4,664,679 (Kohyama et al.), issued May 12, 1987.

The Michalski '236 patent discloses a method for protecting aqueous colloidal silica sols from bacterial contamination. This patent suggests that colloidal aqueous silica sols can be protected from bacterial contamination by simply adding sodium chlorite in an amount sufficient to inhibit growth and reproduction of the bacteria. Generally from about 10 parts of sodium chlorite per million parts of slurry up to about 1000 parts per million achieve the desired situation of freedom from bacterial contamination.

The Havens patent suggests that colloidal silica aquasols containing about 10–1000 parts per million of hexachlorophene can be protected from contamination by microorganisms. Addition of the hexachlorophene is intended to prevent discoloration, bad odor, and slime formation and increase the shelf life of colloidal silica sols to more than one year.

The Payne '431 and Nickerson patents are concerned with controlling bacterial growth in silica aquasols containing polyhydric alcohols. Payne 431' attempts to control and eliminate the growth of organisms such as aerobacter and pseudomonus bacteria, aspergillus niger mold, and troublesome desulfovibio and clostridia anaerobic bacteria by addition of a biocide. Typical biocides are glutaraldehyde, ethylenediamine, hydrogen peroxide and methyl p-hydroxybenzoate. Nickerson suggests that the addition of sodium pentachlorophenate will prevent or inhibit the darkening of silica aquasol containing polyhydric alcohol even in those instances where the silica aquasol contains sodium sulfate.

The Yoder and Roman et al. patents disclose the use of dialdehydes, such as glutaraldehyde, to control bacteria. While Michalski et al. '275 and McGahen disclose the use of formaldehyde to protect colloidal silica sols from bacteria growth. McGahen also discloses the use of 3,5-dimethyl tetrahydro 1,3,5,2-H-thiadiazine-2-thione as a microbiocide.

Although each of the aforementioned patents discloses various biocides for inhibiting bacterial growth in colloidal silicas, none of the aforementioned aquasols are satisfactory for use in the polishing of silicon wafers. That is, the aforementioned aquasols have unacceptable polishing rates for use in recirculated polishing systems.

The Payne '337, Payne '188, Payne '421, and Huff '612 disclose the use of various polishing rate accelerator amines added to conventional colloidal silica to form acceptable polishing agents. However, these patents are not concerned with either a low metals, low sodium colloidal silica or with a polishing agent which can be recirculated without increased microorganism or fungi growth.

Kohyama et al. discloses an aqueous dispersion of silicic anhydride having a silica particle size in the range between about 100 nm to 10,000 nm which is prepared from a dry method. PH controlling agents, such as amines, may be added to the silicic anhydride of Kohyama et al. The silicas prepared according to Kohyama et al. exhibit the following characteristics: (1) the particles are prepared by a dry method which can then be dispersed into a fluid medium, (2) the particles are not discrete but exist as condensed masses or aggregates, and (3) the aggregates settle with time and hence do not fit the historical definition of a silica colloid. Nor is Kohyama et al. concerned with low metals, low sodium colloidal silica or control of microorganism or fungi growth in recirculating systems.

The present inventors have found that although no microbiological growths are present in conventional colloidal silica at the outset, increased microbiological growth is observed during recirculation and dilution of the slurry. These microbiological growths are promoted when organic rate accelerators are used.

The present inventors undertook the task of examining the recirculation polishing system and developing a novel group of colloidal silica slurries which eliminate bacterial and fungi growth, maintain and, in some instances, increase the polishing rate of the system, and provide a polishing medium with extremely low values, particularly of Al, Fe, K, Na, and the other transition metals as described above.

Through lengthy experimentation, the present inventors have developed a novel group of low sodium, low metals colloidal silica slurries which are capable of inhibiting bacterial growth and enhancing the polishing rate of silicon wafers. These colloidal silica slurries are formed from a low metal, ammonium-stabilized silica sol that has particle sizes ranging from about 4 to about 130 nanometers. This sol has discrete spherical particles, and finds particular use in high quality investment casting, high technology refractories, catalyst applications, electronic polishing agents, and in high technology coating applications.

Additional advantages of the present invention shall become apparent as described below.

SUMMARY OF THE INVENTION

It is the primary object of the present invention to provide a novel colloidal slurry which is capable of inhibiting bacterial growth and enhancing the rate of polishing silicon wafers, while also providing a polishing slurry which has low sodium and metal content. It may also be desirable to provide a polishing slurry which has a low anion content.

The novel colloidal silica slurry of the present invention comprises: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; and a bactericide, a polishing rate accelerator which differs from the bactericide, and/or a sodium chlorite or sodium hypochlorite biocide. Optionally, a fungicide may be added to the slurry to inhibit fungi growth.

An additional object of the present invention is a process for polishing a silicon wafer which includes the step of recirculating the novel colloidal silica slurry of the present invention between a polishing plate containing a polishing pad and the silicon wafer, the improvement characterized by the use of a colloidal silica slurry comprising: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; and a bactericide, a polishing rate accelerator which differs from the bactericide, and/or a sodium chlorite or sodium hypochlorite biocide. Optionally, a fungicide can be added to the slurry for the purpose of inhibiting fungi growth.

The present invention may also include many additional features which shall be further described below.

DESCRIPTION OF THE PREFERRED EMBODIMENTS

In the polishing of silicon wafers or substrates for use in electronic devices it is preferable to recirculate a colloidal silica slurry having a low sodium and metal content which avoids bacterial and fungi growth, while enhancing the polishing rate of the system. Silicon wafers or substrates are basic components of integrated circuits, semiconductor devices, and transistors.

Low sodium, low metal impurity silica products for recirculated wafer polishing systems can be prepared from low metal silica sources, such as tetramethyl- or tetraethyl-orthosilicate or silicon tetrachloride. The colloidal silicas can be prepared from these materials by a controlled hydrolysis reaction, although any procedure which yields low metals can be used. After dialysis to remove unwanted sodium and metals, the products can be stabilized with the addition of counterions. The counterions may be selected from ammonium hydroxide, amines, quaternary ammonium hydroxides (tetramethyl-or tetraethyl-ammonium hydroxide), or mixtures thereof. Although it has been found to be highly desirable to stabilize the resultant sol with ammonium hydroxide.

More preferably, however, is the preparation of a low sodium, low metals silica sol as disclosed in co-pending U.S. patent application Ser. No. 07/546,952, filed on Jul. 2, 1990, and similarly assigned to the assignee of the present invention, which is incorporated herein by reference.

According to U.S. Ser. No. 07/546,952, a low metal, ammonium-stabilized silica sol can be made using the following steps:

(a) diluting a commercial grade sodium silicate solution with water to obtain a dilute sodium silicate solution containing from 5.0 to about 8.0 weight percent sodium silicate, as $SiO_2$; and then (b) exposing the dilute sodium silicate solution to a strong cation exchange resin in the acid form and in sufficient amount and with sufficient capacity to remove essentially all sodium values and other cation values contained in the dilute sodium silicate solution thereby forming a dilute silicic acid solution, now containing from 1 5.0 to about 8.0 weight percent silicic acid as $SiO_2$; and then (c) adding to the dilute silicic acid solution at least 0.10 weight percent, based on $SiO_2$, of oxalic acid crystals and at least 0.25 weight percent, based on total silicic acid solution, of a strong inorganic acid chosen from the group consisting of $H_2SO_3$, HCl, $HNO_3$, and aqua regia, thereby forming an oxalate-containing, low pH silicic acid solution, which solution has a pH ranging from about 0.5 to about 2.5; and then (d) mixing with or without cooling the oxalate-containing low pH silicic acid solution for about 0.5 to about 24 hours, recovering the aforesaid silicic acid solution which contains from about 5.0 to about 8.0 weight percent silicic acid, as $SiO_2$; and then (e) exposing the aforesaid silicic acid solution to a strong anion exchange resin in the hydroxide form, and in sufficient amount and with sufficient capacity to replace essentially all negatively charged species contained therein with hydroxide ions, thereby forming an hydroxide-neutralized silicic acid solution having a pH ranging between about 2.5 to 4.0; and then (f) exposing this hydroxide-neutralized silicic acid solution to a strong cation exchange resin in the acid form and in sufficient amount and with sufficient capacity to replace all positively charged species contained therein with hydrated protons, thereby forming a low-metal silicic acid solution; and then (g) chilling the low-metal silicic acid solution to a temperature ranging between about 40° F. to 50° F., and storing, with or without stirring, for from one minute to about fifty (50) hours, thereby forming a chilled low-metal silicic acid solution; and then (h) adding from 0 to 50 volume percent of the low-metal silicic acid solution to a preformed ammonium hydroxide solution made by adding concentrated ammonium hydroxide to deionized or softened water in sufficient quantity to achieve the preformed ammonium hydroxide solution having a pH ranging between about 8.0 to about 11.2, thereby forming an ammonium-neutralized silicic acid heel solution having a pH ranging between about 8.0 to about 11.2; and then (i) heating the heel solution to a temperature ranging between about 75° C. to about 150° C., under sufficient pressure to prevent boiling, and then maintaining this temperature for from about 0.5 hours to about twenty-four (24) hours, while slowly adding, either continuously or incrementally with stirring, the remainder of the low-metal silicic acid solution, thereby reacting same with formed or forming silica sol particles, while simultaneously adding, either continuously or incrementally, sufficient ammonium hydroxide solution to maintain a pH ranging from about 8.0 to about 11.2, and finally forming a dilute ammonium-stabilized low-metal silica sol admixture; and then (j) reacting this final admixture, at a temperature from 75° C. to about 150° C., at pressure sufficient to prevent boiling, for an additional 0.5 to about 8.0 hours, thereby forming a dilute, low-metals silica sol solution containing from about 2.0 to about 6.0 weight percent silica, as $SiO_2$; and then (k) concentrating the dilute, low-metals silica sol solution to a concentrated low-metals, ammonium-stabilized silica sol having the following characteristics:
$SiO_2$ ranging from 15 to 50 weight percent,
pH 8.5 to 11.3,
Particle Diameter of 4.0 to 130 nm,
Aluminum, as Al, <100 ppm, based on $SiO_2$,
Iron, as Fe, <50 ppm, based on $SiO_2$,
Potassium, as K, <25 ppm, based on $SiO_2$, and
Sodium, as Na, <500 ppm, based on $SiO_2$.

The colloidal silica slurry according to the present invention preferably comprising: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; a bactericide present in an amount between about 0.08 to about 5%, the bactericide is at least one compound selected from the group consisting of tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms; and sodium chlorite or sodium hypochlorite present in an amount between about 0 to about 1000 ppm. Optionally, a polishing rate accelerator which differs from the aforementioned bactericide, and a fungicide can be added to the slurry to increase polishing rate and inhibit fungi growth, respectively.

The polishing rate accelerator, if present, is generally of an amount between about 0–5%. The bactericide is present in an amount between about 0.08–5%, preferably about 0.5–0.75%. The biocide is present in an amount between about 0–1000 ppm, preferably 0–500 ppm, and more preferably about 65–100 ppm. The fungicide is added to the colloidal silica slurry in an amount between about 0–2.0%, preferably 0–0.8%, and more preferably 0.1–0.5%.

Alternatively, the colloidal silica slurry may comprise: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; and a polishing rate accelerator present in an amount between about 0.5 to about 5%. In accordance with this embodiment, a sodium chlorite or sodium hypochlorite biocide and/or a fungicide may also be added as required.

COLLOIDAL SILICA

The colloidal silica is preferably prepared in accordance with the aforementioned method disclosed in copending U.S. patent application Ser. No. 07/546,952 (Payne et al.). The discrete spherical particles formed in that process are different from the chain-like particles that are formed in other processes attempting to achieve very low-metals silica sols. By stabilizing the silica sol with ammonium hydroxide and by using the oxalate complexing agents, a silica sol is formed having characteristics, after concentration, preferably by ultra-filtration, as follows:
Silica, as $SiO_2$, of 15–50 weight percent,
pH, as adjusted with ammonia, ranging from between about 8.5–11.3, and
Particle Diameter ranging from about 4.0 to 130 nm.

These characteristics are further and primarily enhanced by the fact that this silica sol has less than 100 ppm, Al, less than 50 ppm Fe, less than 25 ppm, less than 500 ppm Na, all based on $SiO_2$.

This process can be also be optimized to form silica sols which are low-metals, ammonium-stabilized silica sols having the following characteristics.

| $SiO_2$ | 25–35 weight percent |
| --- | --- |
| pH | 8.5–9.5 |
| Particle Diameter | 3.0 to 100 nm |
| Aluminum, as Al | <90 ppm, based on $SiO_2$ |
| Iron, as Fe | <50 ppm, based on $SiO_2$ |
| Potassium, as K | <25 ppm, based on $SiO_2$ |
| Sodium, as Na | <900 ppm, based on $SiO_2$ |

Optionally, another silica sol has the following characteristics:

| $SiO_2$ | 30 ± 2.5 weight percent |
| --- | --- |
| pH | 9.0 ± 0.25 |
| Particle Diameter | 5 to 30 nm |
| Aluminum, as Al | <30 ppm, based on $SiO_2$ |
| Iron, as Fe | <15 ppm, based on $SiO_2$ |
| Potassium, as K | <10 ppm, based on $SiO_2$ |
| Sodium, as Na | <100 ppm, based on $SiO_2$ |

Still another silica sol has the following characteristics:

| $SiO_2$ | 30 ± 2.5 weight percent |
| --- | --- |

-continued

| | |
|---|---|
| pH | 9.0 ± 0.25 |
| Particle Diameter | 30 to 100 nm |
| Aluminum, as Al | <30 ppm, based on $SiO_2$ |
| Iron, as Fe | <15 ppm, based on $SiO_2$ |
| Potassium, as K | <10 ppm, based on $SiO_2$ |
| Sodium, as Na | <100 ppm, based on $SiO_2$ |

Even large particle size silica sols can be made having the characteristics:

| | |
|---|---|
| $SiO_2$ | 30 ± 5 weight percent |
| pH | 9.0 ± 0.5 |
| Particle Diameter | 30 to 130 nm |
| Aluminum, as Al | < 50 ppm, based on $SiO_2$ |
| Iron, as Fe | < 25 ppm, based on $SiO_2$ |
| Potassium, as K | < 15 ppm, based on $SiO_2$ |
| Sodium, as Na | < 100 ppm, based on $SiO_2$ |

POLISHING RATE ACCELERATOR

The polishing rate accelerator can be any amine/nitrogen compound. However, it is preferable that the polishing rate accelerator be at least one compound selected from the group consisting of: primary amines, secondary amines, tertiary amines, heterocyclic amines, and mixtures thereof. Quaternary amines can be used, but only in combination with one of the other types of amines. It is intended that the above classification include all blends thereof which are known to those skilled in the art. Provided, however, that the polishing rate accelerator cannot be a quaternary amine when used in conjunction with quaternary amine bactericides.

Examples of primary amines are monoethanolamine, isopropylamine, ethylenediamine, and propanediamine. Examples of secondary amines are diethanolamine, dipropylamine, and dibutylamine. An example of a tertiary amine is triethanolamine. Examples of quaternary amines are tetramethylammonium chloride or hydroxide, tetraethylammonium chloride or hydroxide, tetrapropylammonium chloride or hydroxide, alkylbenzyldimethylammonium chloride or hydroxide, wherein the alkyl chain ranges from 1 to about 20 carbons. Examples of heterocyclic amines are hexamethylenediamine, bis(aminopropyl) piperazine, and piperazine. The polishing rate accelerator may also be one compound selected from the group consisting of diethylenetriamine, triethylenetetramine, tetraethylenepentamine, and aminoethylethanolamine.

BACTERICIDE

The bactericide is at least one compound selected from the group consisting of: tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium hydroxide, and alkylbenzyldimethylammonium chloride, wherein the alkyl chain ranges from 1 to about 20 carbons. Preferred bactericides are those capable of serving a dual function, i.e., being a bactericide and a polishing rate enhancer.

BIOCIDE

The preferred biocide is sodium chlorite or sodium hypochlorite.

FUNGICIDE

The preferred fungicide is sodium OMADINE ® (pyrithione).

The novel colloidal silica slurry of the present invention is preferably used in a process for polishing a silicon wafer. The silicon wafer polishing process includes the step of recirculating a colloidal silica slurry comprising: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; a bactericide present in an amount between about 0.08 to about 5%, the bactericide is at least one compound selected from the group consisting of tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms; and sodium chlorite or sodium hypochlorite present in an amount between about 0 to about 1000 ppm, between a polishing plate containing a polishing pad and the silicon wafer.

Optionally, a polishing rate accelerator may be added to the aforementioned colloidal silica in an amount between about 0.5 to about 5%. The polishing rate accelerator preferably differs from the bactericide and is at least one compound selected from the group consisting of: primary amines, secondary amines, heterocyclic amines, diethylenetriamine, triethylenetetramine, tetraethylenepentamine, and aminoethylethanolamine, and mixtures thereof.

This process for polishing a silicon wafer may alternatively include the step of recirculating a colloidal silica slurry comprising: a low metals ammonium-stabilized silica sol having the following characteristics: $SiO_2$ present in the range between about 15 to about 50 weight percent; a pH in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm based on $SiO_2$; potassium, as K, present in an amount less than about 25 ppm based on $SiO_2$; and sodium, as Na, present in an amount less than about 500 ppm based on $SiO_2$; and a polishing rate accelerator present in an amount between about 0.5 to about 5%, between a polishing plate containing a polishing pad and the silicon wafer. The colloidal silica slurry may optionally include a sodium chlorite or sodium hypochlorite biocide and/or fungicide to inhibit microorganism and fungi growth.

The effectiveness of the novel colloidal silica slurries of the present invention can best be shown through the following examples.

EXAMPLE 1

This experiment demonstrates the effect of the bactericide tetramethylammonium hydroxide (TMA-OH) in eliminating aerobic bacteria and mold. Tetramethylammonium chloride may also be used with the same effect. Sample 1 is deionized water, sample 2 is a conventional colloidal silica used in the polishing of silicon wafers, and sample 3 is a low sodium, low metals colloidal silica slurry in accordance with the present invention.

The microbiological test procedures used in generating the following results were as follows: (1) Dilute one part product with 20 parts water (do not make a pH adjustment); (2) Challenge the product with a bacteria/mold inoculum consisting of: (a) Aspergillus niger, (b) Pseudomonus aeruginosa, and (c) Aerobacter aerogenes; (3) Place the inoculated sample on a rotating shaker in a room conditioned at 37° C. (rotate at 100 rpm continuously); and (4) Sample at zero time, one week, and two weeks. The organisms are grown under the following conditions: (a) Total count - run at 37° C. for 72 hours using TGE agar (tryptone-glucose extract), (b) Aspergillus -run at 30° C. for 96 hours using potato dextrose, and (c) Aerobacter - run at 37° C. for 24 hours using EMB agar (eosin methylene blue).

Table 1 below shows the results of the microbiological testing. A 99.0% or greater kill is considered an acceptable colloidal silica slurry.

TABLE 1

TMA-OH Microbiological Results
Initial Bacteria Cts. = 8.3E08; Initial Mold Cts. = 8E04

| Sample | % Amine | Available Chlorine (ppm) | % Active TMA-OH | % Active Na-Omadine | Incub. Time | % Bact. Killed | % Mold Killed |
|---|---|---|---|---|---|---|---|
| 1 | None | None | None | None | 1 wk | None | None |
|   |      |      |      |      | 2 wk | None | None |
| 2 | 2% AEEA | 100 | None | None | 1 wk | 43 | 61 |
|   |         |     |      |      | 2 wk | 98 | 90 |
| 3 | 4.5% PIP | 100 | 0.68 | 0.32 | 1 wk | ~100 | 99.8 |
|   |          |     |      |      | 2 wk | ~100 | ~100 |

AEEA denotes aminoethylethanolamine
PIP denotes piperazine

Table 1 demonstrates the effect of the TMA-OH with and without sodium Omadine ® on bacteria and mold. The results indicate that 0.68% active TMA-OH with sodium chlorite and sodium OMADINE ® (pyrithione) will inhibit the products after one or two weeks.

EXAMPLE 2

A colloidal silica slurry according to the present invention was prepared and evaluated verses conventional colloidal silicas. Sample 1 is a conventional colloidal silica containing 2% aminoethylethanolamine (AEEA), sample 2 is a conventional colloidal silica containing 5% piperazine, and sample 3 is a low sodium, low metals colloidal silica slurry according to the present invention.

The field trials set forth below in Table 3 were conducted under the following operating parameters. The polishing machine was a Fujikosi four head 27" M/C having a platen of 27" diameter with four polishing heads, capable of holding three 4" wafers. The wafers were P-100 type; boron doped; 4" diameter; acid etched. Silica level was 3.53% as $SiO_2$. The polishing pad was a 27" diameter Suba 600.

The polishing conditions for the field trials were as follows: polishing pressure of 370 $g/cm^2$ (5.2 $lb/in^2$), polishing speed of 50 RPM (platen), polishing temperature of 26°–30°, a pH of 10.7–9.7 (start to finish), KOH caustic, a flow rate of 2000 mL/min. (recirculated), and a total removal amount of 15 micrometers.

Table 2 below set forth the compositions of the samples 1–3.

TABLE 2

| Component | Sample 1 | Sample 2 | Sample 3 |
|---|---|---|---|
| Base silica | A | A | B |
| Counter Ion | Na | Na | $NH_4$ |
| Polishing Rate Accelerator | 2% AEEA | 5% PIP | 4.5% PIP |
| Sodium Chlorite | yes | yes | yes |
| Sodium Omadine ® | no | yes | yes |
| Quaternary | no | yes | yes |

Silica A = 50% $SiO_2$, particle size of 50–70 nm (nothing over 90 nm)
Silica B = 40% $SiO_2$, particle size of >70 nm (deionized product)

The field test results were obtained using the following polishing test procedures: (1) Place new polishing pad on machine; (2) Dress the pad by first rinsing with deionized water and then scraping the pad with a razor blade; (3) Load a set of wafers on the machine; (4) Start the slurry flow to purge the lines and soak the pad; (5) Make a service run at the desired pressure and flow rate; (6) After the service run is over, rinse the wafers, remove from the carriers and replace with more wafers; (7) Place in hot ($\geq 170°$ F.) water for a period of 5–10 minutes; and (8) Air dry the wafers.

TABLE 3

(Polishing Results)

| Sample | % Amine | % Active TMA-OH | % Active Na Pyrithione Fungicide | Cation | $R_a$ | Average Pol. Rate Start | Fin |
|---|---|---|---|---|---|---|---|
| 1 | 2% AEEA | 0 | 0 | Na | 29 ± 1 | 0.48 | 0.48 |
| 2 | 5% PIP | 0.75 | 0.08 | Na | 31 ± 0 | 0.66 | 0.73 |
| 3 | 4.5% PIP | 0.68 | 0.08 | $NH_4$ | 28 ± 1 | 0.70 | 0.77 |

$R_a$ denotes surface roughness in microns.
AEEA denotes aminoethylethanolamine.
PIP denotes piperazine.

Table 3 compares the polishing rates of the colloidal silica slurry of the present invention (Sample 3) verses conventional colloidal silicas (Samples 1 and 2) using the same polishing conditions. The present invention was stabilized with ammonia instead of sodium as in samples 1 and 2, and resulted in a polishing rate equivalent to or greater than the conventional colloidal silicas while maintaining reduced sodium levels.

In Table 4 below the polished wafer quality and polishing parameters of the colloidal silica slurry of the present invention (sample 3) are compared with those of conventional colloidal silicas (samples 1 and 2). The colloidal silica slurry of the present invention produced wafers with the same wafer quality as the conventional slurries, while maintaining the same pad characteristics after polishing.

TABLE 4

(Polishing Wafer Quality & Polishing Parameters)

| Sample | Temperature | Scratches per 3 Wafers | Surface Texture | Pad Cleanability | Pad Glazing |
|---|---|---|---|---|---|
| 1 | 26–27° C. | 0 | Acceptable | Good | Acceptable |
| 2 | 28–29° C. | 0 | Acceptable | Good | Acceptable |
| 3 | 29–30° C. | 0 | Acceptable | Good | Acceptable |

EXAMPLE 3

Silicon wafers can be polished using high purity colloidal silicas prepared in accordance with the procedures set forth in U.S. patent application Ser. No. 07/546,952. A 30% ammonium-stabilized silica sol having a particle diameter of about 14.4 nm was prepared in accordance with those procedures (Sample 1). Table 5 below lists the metal analyses as done by Ion Coupled Argon Plasma (ICP) of Sample 1. The total metal content based on the average of analyses 1 and analyses 2 is 256 ppm.

TABLE 5

Metal Analyses for Sample 1 (ICP Result)

| Metals | Analyses 1 BOS | Analyses 2 BOS | Average |
|---|---|---|---|
| Na | 17.4 | 21.5 | 19.4 |
| Ca | 13.3 | 12.3 | 12.8 |
| Mg | 9.5 | 9.2 | 9.4 |
| Al | 88.6 | 85.4 | 87.0 |
| Cr | 0.6 | 0.6 | 0.6 |
| Cu | 5.1 | 3.5 | 4.3 |
| Fe | 23.7 | 23.1 | 23.4 |
| K | 4.7 | 4.7 | 4.7 |
| Sn | 1.9 | 1.6 | 1.8 |
| Sr | 0.6 | 0.6 | 0.6 |
| Ti | 72.8 | 72.8 | 72.8 |
| Zn | 1.6 | 1.6 | 1.6 |
| Zr | 17.4 | 17.1 | 17.2 |

BOS denotes based on $SiO_2$

Sample 1 was tested on a Siltec 3800 polishing machine against Sample 2 (i.e., a 50% conventional colloidal silica sol having a particle diameter in the range between about 50–70 nm), and Sample 3 (i.e., Sample 1 with an AEEA polishing rate accelerator). The operating conditions for the silicon wafer polishing was as follows:

| | |
|---|---|
| Number of Polishing Heads | 4 × 21-inch diameter |
| Polishing Speed | 65 rpm |
| Polishing Pressure | 5.55 lb/in² |
| Polishing Time | 20 minutes |
| Flow Rate | 189 mil/minute |
| Temperature | 42 to 45° C. |
| $SiO_2$ Concentration | 2.8% |
| Polishing pH | 11.0 |
| Caustic Used | 45% KOH |

There was no statistical change in polishing rate from the conventional silica sol to the high purity colloidal silicas. The result are set forth in Table 6 below.

TABLE 6

| Sample No. | Mean PD (nm) | $SiO_2$ to AEEA Ratio | Removal Rate (mils/20 min.) |
|---|---|---|---|
| 1 | 18.2 | 23.1 | 0.846 |
| 2 | 62.0 | 23.2 | 0.839 |
| 3 | 14.5 | 23.1 | 0.846 |

The silica used in samples 1 and 3 was much smaller in size than that used in sample 2, so it was expected that there might be scratching of the wafer surface during polishing. However, no difference in wafer quality was detected suggesting that samples 1 and 3 are acceptable.

EXAMPLE 4

The various high purity colloidal silicas set forth in Table 7 below each demonstrated acceptable polishing rates.

TABLE 7

(Stock Removal Type Products using High Purity Silica Sols)

| Property | Product A | Product B | Product C | Product D |
|---|---|---|---|---|
| $SiO_2$ Concentration | 30.4% | 30.0% | 22.2% | 27.6% |
| Particle Diameter (nm) | 14.4 | 14.4 | 14.4 | 14.4 |
| Type/Amount Amine | PIP/ 1.3% | AEEA/ 1.3% | PIP/ 3.25% | PIP/ 4.48% |
| $SiO_2$/Amine Weight Ratio | 23.1 | 23.2 | 6.85 | 6.16 |
| TMA-OH Bactericide | None | None | 0.19% | 0.68% |
| $NaClO_2$ Biocide | None | 0.0065% | 0.02% | 0.01% |
| Na Omadine ® Fungicide | None | None | 0.03% | 0.08% |

While we have shown and described several embodiments in accordance with our invention, it is to be clearly understood that the same are susceptible to numerous changes and modifications apparent to one skilled in the art. Therefore, we do not wish to be limited to the details shown and described but intend to show all changes and modifications which come within the scope of the appended claims.

What is claimed is:

1. A colloidal silica slurry comprising:
   a low metals ammonium-stabilized silica sol formed by:
   (a) diluting said silica-containing solution with water to obtain a dilute silica-containing solution containing from about 5.0 to about 8.0 weight percent silica, as $SiO_2$;
   (b) exposing said dilute silica-containing solution to a cation exchange resin in the acid form and in sufficient capacity to remove essentially all sodium values, thereby forming a dilute silicic acid solution, said silicic acid solution comprising from about 5.0 to about 8.0 weight percent silicic acid as $SiO_2$;
   (c) adding to said silicic acid solution at least 0.10 weight percent, based on $SiO_2$, of oxalic acid crystals and at least 0.25 weight percent, based on total silicic acid solution, of an inorganic acid, thereby forming an oxalate-containing, low pH silicic acid solution having a pH ranging from about 0.5 to about 2.5;

(d) mixing said oxalate-containing, low pH silicic acid solution to recover silicic acid solution which contains from about 5.0 to about 8.0 weight percent silicic acid, as $SiO_2$;

(e) exposing said silicic acid solution to an anion exchange resin in the hydroxide form, and in sufficient amount and with sufficient capacity to replace essentially all negatively charged species contained therein with hydroxide ions, thereby forming a hydroxide-neutralized silicic acid solution having a pH ranging between about 2.5 to about 4.0;

(f) exposing said hydroxide-neutralized silicic acid solution to a cation exchange resin in the acid form and in sufficient amount and with sufficient capacity to replace all positively charged species contained therein with hydrated protons, thereby forming a low metals silicic acid solution;

(g) chilling said low metals silicic acid solution to a temperature ranging between about 40° F. to about 50° F., and storing for from one minute to about fifty hours, thereby forming a chilled low metals silicic acid solution;

(h) adding up to 50 volume percent of the low metals silicic acid solution to a preformed ammonium hydroxide solution made by adding concentrated ammonium hydroxide to deionized or softened water in sufficient quantity to achieve the preformed ammonium hydroxide solution having a pH ranging between about 8.0 to about 11.2, thereby forming an ammonium-neutralized silicic acid heel solution having a pH ranging between about 8.0 to about 11.2;

(i) heating said heel solution to a temperature ranging between about 75° C. to about 150° C., under sufficient pressure to prevent boiling, and then maintaining this temperature for from about 0.5 hours to about twenty-four hours thereby forming silica sol particles, while adding, with stirring, the remainder of the low metals silicic acid solution, thereby reacting same with said silica sol particles, while simultaneously adding sufficient ammonium hydroxide solution to maintain a pH ranging from about 8.0 to about 11.2, and finally forming a dilute ammonium-stabilized low metals silica sol admixture;

(j) reacting this final admixture, at a temperature from 75° C. to about 150° C., at pressure sufficient to prevent boiling, for an additional 0.5 to about 8 hours, thereby forming a dilute, low metals silica sol solution containing from about 2.0 to about 6.0 weight percent silica, as $SiO_2$; and (k) concentrating the dilute, low metals sol solution thereby forming said low metals ammonium-stabilized silica sol; said low metals ammonium-stabilized silica sol having the following characteristics: $SiO_2$ present in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm, based on $SiO_2$; potassium, as K, present in an amount less than about 25 ppm, based on $SiO_2$; and sodium, as Na, present in an amount less than about 500 ppm, based on $SiO_2$;

a bactericide present in an amount between about 0.08 to about 5%, said bactericide is at least one compound selected from the group consisting of tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms; and sodium chlorite or sodium hypochlorite present in an amount between about 1 to about 1000 ppm.

2. The colloidal silica slurry according to claim 1, wherein said bactericide is present in an amount between about 0.1 to about 1.25%.

3. The colloidal silica slurry according to claim 2, wherein said bactericide is present in an amount between about 0.5 to about 0.75%.

4. The colloidal silica slurry according to claim 1, wherein said sodium chlorite or sodium hypochlorite is present in an amount between about 65 ppm to about 100 ppm.

5. The colloidal silica slurry according to claim 1, further comprising a fungicide present in an amount between about 0.1 to about 2.0%.

6. The colloidal silica slurry according to claim 5, wherein said fungicide is present in an amount between about 0.1 to about 0.8%.

7. The colloidal silica slurry according to claim 6, wherein said fungicide is present in an amount between about 0.1 to about 0.5%.

8. The colloidal silica slurry according to claim 5, wherein said fungicide is sodium pyrithione.

9. The colloidal silica slurry according to claim 1, further comprising a polishing rate accelerator which is present in an amount between about 0.5 to about 5%, said polishing rate accelerator is at least one compound selected from the group consisting of: primary amines, secondary amines, heterocyclic amines, diethylenetriamine, triethylenetetramine, tetraethylenepentamine, and aminoethylethanolamine, and mixtures thereof.

10. The colloidal silica slurry according to claim 9, wherein said primary amines are selected from the group consisting of: monoethanolamine, isopropylamine, ethylenediamine, and propanediamine.

11. The colloidal silica slurry according to claim 9, wherein said secondary amines are selected from the group consisting of: diethanolamine, dipropylamine, and dibutylamine.

12. The colloidal silica slurry according to claim 9, wherein said heterocyclic amines are selected from the group consisting of: hexamethylenediamine, bis(aminopropyl) piperazine, and piperazine.

13. A colloidal silica slurry comprising:
a low metals ammonium-stabilized silica sol formed by:

(a) diluting said silica-containing solution with water to obtain a dilute silica-containing solution containing from about 5.0 to about 8.0 weight percent silica, as $SiO_2$;

(b) exposing said dilute silica-containing solution to a cation exchange resin in the acid form and in sufficient capacity to remove essentially all sodium values, thereby forming a dilute silicic acid solution, said silicic acid solution comprising from about 5.0 to about 8.0 weight percent silicic acid as $SiO_2$;

(c) adding to said silicic acid solution at least 0.10 weight percent, based on $SiO_2$, of oxalic acid crystals and at least 0.25 weight percent, based on total silicic acid solution, of an inorganic acid, thereby forming an oxalate-containing, low pH silicic acid solution having a pH ranging from about 0.5 to about 2.5;

(d) mixing said oxalate-containing, low pH silicic acid solution to recover silicic acid solution which contains from about 5.0 to about 8.0 weight percent silicic acid, as $SiO_2$;

(e) exposing said silicic acid solution to an anion exchange resin in the hydroxide form, and in sufficient amount and with sufficient capacity to replace essentially all negatively charged species contained therein with hydroxide ions, thereby forming a hydroxide-neutralized silicic acid solution having a pH ranging between about 2.5 to about 4.0;

(f) exposing said hydroxide-neutralized silicic acid solution to a cation exchange resin in the acid form and in sufficient amount and with sufficient capacity to replace all positively charged species contained therein with hydrated protons, thereby forming a low metals silicic acid solution;

(g) chilling said low metals silicic acid solution to a temperature ranging between about 40° F. to about 50° F., and storing for from one minute to about fifty hours, thereby forming a chilled low metals silicic acid solution;

(h) adding up to 50 volume percent of the low metals silicic acid solution to a preformed ammonium hydroxide solution made by adding concentrated ammonium hydroxide to deionized or softened water in sufficient quantity to achieve the preformed ammonium hydroxide solution having a pH ranging between about 8.0 to about 11.2, thereby forming an ammonium-neutralized silicic acid heel solution having a pH ranging between about 8.0 to about 11.2;

(i) heating said heel solution to a temperature ranging between about 75° C. to about 150° C., under sufficient pressure to prevent boiling, and then maintaining this temperature for from about 0.5 hours to about twenty-four hours thereby forming silica sol particles, while adding, with stirring, the remainder of the low metals silicic acid solution, thereby reacting same with said silica sol particles, while simultaneously adding sufficient ammonium hydroxide solution to maintain a pH ranging from about 8.0 to about 11.2, and finally forming a dilute ammonium-stabilized low metals silica sol admixture;

(j) reacting this final admixture, at a temperature from 75° C. to about 150° C., at pressure sufficient to prevent boiling, for an additional 0.5 to about 8 hours, thereby forming a dilute, low metals silica sol solution containing from about 2.0 to about 6.0 weight percent silica, as $SiO_2$; and (k) concentrating the dilute, low metals sol solution thereby forming said low metals ammonium-stabilized silica sol; said low metals ammonium-stabilized silica sol having the following characteristics: $SiO_2$ present in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm, based on $SiO_2$; potassium, as K, present in an amount less than about 25 ppm, based on $SiO_2$; and sodium, as Na, present in an amount less than about 500 ppm, based on $SiO_2$; and a polishing rate accelerator present in an amount between about 0.5 to about 5%.

14. The colloidal silica slurry according to claim 13, wherein said polishing rate accelerator is at least one compound selected from the group consisting of: primary amines, secondary amines, tertiary amines, heterocyclic amines, and mixtures thereof.

15. The colloidal silica slurry according to claim 14, wherein said primary amines are selected from the group consisting of: monoethanolamine, isopropylamine, ethylenediamine, and propanediamine.

16. The colloidal silica slurry according to claim 14, wherein said secondary amines are selected from the group consisting of: diethanolamine, dipropylamine, and dibutylamine.

17. The colloidal silica slurry according to claim 14, wherein said tertiary amine is triethanolamine.

18. The colloidal silica slurry according to claim 14, wherein said heterocyclic amines are selected from the group consisting of: hexamethylenediamine, bis(aminopropyl) piperazine, and piperazine.

19. The colloidal silica slurry according to claim 13, wherein said polishing rate accelerator includes at least one quaternary amine.

20. The colloidal silica slurry according to claim 19, wherein said quaternary amine is selected from the group consisting of: tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms.

21. The colloidal silica slurry according to claim 13, wherein said polishing rate accelerator is selected from the group consisting of diethylenetriamine, triethylenetetramine, tetraethylenepentamine, and aminoethylethanolamine.

22. The colloidal silica slurry according to claim 13, further comprising either sodium chlorite or sodium hypochlorite in an amount between about 1 ppm to about 1000 ppm.

23. The colloidal silica slurry according to claim 22, wherein either the sodium chlorite or sodium hypochlorite are present in an amount between about 65 ppm to about 100 ppm.

24. The colloidal silica slurry according to claim 13 further comprising a fungicide in an amount between about 0.1 to about 2%.

25. The colloidal silica slurry according to claim 24, wherein said fungicide is present in an amount between about 0.1 to about 0.8%.

26. The colloidal silica slurry according to claim 25, wherein said fungicide is present in an amount between about 0.1 to about 0.5%.

27. The colloidal silica slurry according to claim 24, wherein said fungicide is sodium pyrithione.

28. A process for polishing a silicon wafer which includes the step of recirculating a colloidal silica slurry comprising: a low metals ammonium-stabilized silica sol formed by:

(a) diluting said silica-containing solution with water to obtain a dilute silica-containing solution containing from about 5.0 to about 8.0 weight percent silica, as $SiO_2$;

(b) exposing said dilute silica-containing solution to a cation exchange resin in the acid form and in sufficient capacity to remove essentially all sodium values, thereby forming a dilute silicic acid solution, said silicic acid solution comprising from about 5.0 to about 8.0 weight percent silicic acid as $SiO_2$;

(c) adding to said silicic acid solution at least 0.10 weight percent, based on $SiO_2$, of oxalic acid crystals and at least 0.25 weight percent, based on total silicic acid solution, of an inorganic acid, thereby forming an oxalate-containing, low pH silicic acid solution having a pH ranging from about 0.5 to about 2.5;

(d) mixing said oxalate-containing, low pH silicic acid solution to recover silicic acid solution which contains from about 5.0 to about 8.0 weight percent silicic acid, as $SiO_2$;

(e) exposing said silicic acid solution to an anion exchange resin in the hydroxide form, and in sufficient amount and with sufficient capacity to replace essentially all negatively charged species contained therein with hydroxide ions, thereby forming a hydroxide-neutralized silicic acid solution having a pH ranging between about 2.5 to about 4.0;

(f) exposing said hydroxide-neutralized silicic acid solution to a cation exchange resin in the acid form and in sufficient amount and with sufficient capacity to replace all positively charged species contained therein with hydrated protons, thereby forming a low metals silicic acid solution;

(g) chilling said low metal silicic acid solution to a temperature ranging between bout 40° F. to about 50° F., and storing for from one minute to about fifty hours, thereby forming a chilled low metals silicic acid solution;

(h) adding up to 50 volume percent of the low metals silicic acid solution to a preformed ammonium hydroxide solution made by adding concentrated ammonium hydroxide to deionized or softened water in sufficient quantity to achieve the preformed ammonium hydroxide solution having a pH ranging between about 8.0 to about 11.2, thereby forming an ammonium-neutralized silicic acid heel solution having a pH ranging between about 8.0 to about 11.2;

(i) heating said heel solution to a temperature ranging between about 75° C. to about 150° C., under sufficient pressure to prevent boiling, and then maintaining this temperature for from about 0.5 hours to about twenty-four hours thereby forming silica sol particles, while adding, with stirring, the remainder of the low metals silicic acid solution, thereby reacting same with said silica sol particles, while simultaneously adding sufficient ammonium hydroxide solution to maintain a pH ranging from about 8.0 to about 11.2, and finally forming a dilute ammonium-stabilized low metals silica sol admixture;

(j) reacting this final admixture, at a temperature from 75° C. to about 150° C., at pressure sufficient to prevent boiling, for an additional 0.5 to about 8 hours, thereby forming a dilute, low metals silica sol solution containing from about 2.0 to about 6.0 weight percent silica, as $SiO_2$; and (k) concentrating the dilute, low metals sol solution thereby forming said low metals ammonium-stabilized silica sol; said low metals ammonium-stabilized silica sol having the following characteristics: $SiO_2$ present in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm, based on $SiO_2$; potassium, as K, present in an amount less than about 25 ppm, based on $SiO_2$; and sodium, as Na, present in an amount less than about 500 ppm, based on $SiO_2$; a bactericide present in an amount between about 0.08 to about 5%, said bactericide is at least one compound selected from the group consisting of tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms; and sodium chlorite or sodium hypochlorite present in an amount between about 1 to about 1000 ppm, between a polishing plate containing a polishing pad and said silicon wafer.

29. The process according to claim 28, wherein said bactericide is present in an amount between about 0.1 to about 1.25%.

30. The process according to claim 29, wherein said bactericide is present in an amount between about 0.5 to about 0.75%.

31. The process according to claim 28, wherein said sodium chlorite or sodium hypochlorite is present in an amount between about 65 ppm to about 100 ppm.

32. The process according to claim 28, further comprising a fungicide present in an amount between about 0.1 to about 2.0%.

33. The process according to claim 32, wherein said fungicide is present in an amount between about 0.1 to bout 0.8%.

34. The process according to claim 33, wherein said fungicide is present in an amount between about 0.1 to about 0.5%.

35. The process according to claim 32, wherein said fungicide is sodium pyrithione.

36. The process according to claim 28, further comprising a polishing rate accelerator which is present in an amount between about 0.5 to about 5%, said polishing rate accelerator is at least one compound selected from the group consisting of: primary amines, secondary amines, heterocyclic amines, diethylenetriamine, triethylenetetramine, tetraethylenepentamine, and aminoethylethanolamine, and mixtures thereof.

37. The process according to claim 36, wherein said primary amines are selected from the group consisting of: monoethanolamine, isopropylamine, ethylenediamine, and propanediamine.

38. The process according to claim 36, wherein said secondary amines are selected from the group consisting of: diethanolamine, dipropylamine, and dibutylamine.

39. The process according to claim 36, wherein said heterocyclic amines are selected from the group consisting of: hexamethylenediamine, bis(aminopropyl) piperazine, and piperazine.

40. A process for polishing a silicon wafer which includes the step of recirculating a colloidal silica slurry comprising: a low metals ammonium-stabilized silica sol formed by:
(a) diluted said silica-containing solution with water to obtain a dilute silica-containing solution containing from about 5.0 to about 8.0 weight percent silica, as $SiO_2$;
(b) exposing said dilute silica-containing solution to a cation exchange resin in the acid form and in sufficient capacity to remove essentially all sodium values, thereby forming a dilute silicic acid solution, said silicic acid solution comprising from about 5.0 to about 8.0 weight percent silicic acid as $SiO_2$;
(c) adding to said silicic acid solution at least 0.10 weight percent, based on $SiO_2$, of oxalic acid crystals and at least 0.25 weight percent, based on total silicic acid solution, of an inorganic acid, thereby forming an oxalate-containing, low pH silicic acid solution having a pH ranging from about 0.5 to about 2.5;
(d) mixing said oxalate-containing, low pH silicic acid solution to recover silicic acid solution which contains from about 5.0 to about 8.0 weight percent silicic acid, as $SiO_2$;
(e) exposing said silicic acid solution to an anion exchange resin in the hydroxide form, and in sufficient amount and with sufficient capacity to replace essentially all negatively charged species contained therein with hydroxide ions, thereby forming a hydroxide-neutralized silicic acid solution having a pH ranging between about 2.5 to about 4.0;
(f) exposing said hydroxide-neutralized silicic acid solution to a cation exchange resin in the acid form and in sufficient amount and with sufficient capacity to replace all positively charged species contained therein with hydrated protons, thereby forming a low metals silicic acid solution;
(g) chilling said low metals silicic acid solution to a temperature ranging between about 40° F. to about 50° F., and storing for from one minute to about fifty hours, thereby forming a chilled low metals silicic acid solution;
(h) adding up to 50 volume percent of the low metals silicic acid solution to a preformed ammonium hydroxide solution made by adding concentrated ammonium hydroxide to deionized or softened water in sufficient quantity to achieve the preformed ammonium hydroxide solution having a pH ranging between about 8.0 to about 11.2, thereby forming an ammonium-neutralized silicic acid heel solution having a pH ranging between about 8.0 to about 11.2;
(i) heating said heel solution to a temperature ranging between about 75° C. to about 150° C., under sufficient pressure to prevent boiling, and then maintaining this temperature for from about 0.5 hours to about twenty-four hours thereby forming silica sol particles, while adding, with stirring, the remainder of the low metals silicic acid solution, thereby reacting same with said silica sol particles, while simultaneously adding sufficient ammonium hydroxide solution to maintain a pH ranging from about 8.0 to about 11.2, and finally forming a dilute ammonium-stabilized low metals silica sol admixture;
(j) reacting this final admixture, at a temperature from 75° C. to about 150° C., at pressure sufficient to prevent boiling, for an additional 0.5 to about 8 hours, thereby forming a dilute, low metals silica sol solution containing from about 2.0 to about 6.0 weight percent silica, as $SiO_2$; and
(K) concentrating the dilute, low metals sol solution thereby forming said low metals ammonium-stabilized silica sol; said low metals ammonium-stabilized silica sol having the following characteristics: $SiO_2$ present in the range between about 8.5 to about 11.3; a particle diameter in the range between about 4.0 to about 130 nm; aluminum, as Al, present in an amount less than about 100 ppm, based on $SiO_2$; iron, as Fe, present in an amount less than about 50 ppm, based on $SiO_2$; potassium, as K, present in an amount less than about 25 ppm, based on $SiO_2$; and sodium, as Na, present in an amount less than about 500 ppm, based on $SiO_2$; and a polishing rate accelerator present in an amount between about 0.5 to about 5%, between a polishing plate containing a polishing pad and said silicon wafer.

41. The process according to claim 40, wherein said polishing rate accelerator is at least one compound selected from the group consisting of: primary amines, secondary amines, tertiary amines, heterocyclic amines, and mixtures thereof.

42. The process according to claim 41, wherein said primary amines are selected from the group consisting of: monoethanolamine, isopropylamine, ethylenediamine, and propanediamine.

43. The process according to claim 41, wherein said secondary amines are selected from the group consisting of: diethanolamine, dipropylamine, and dibutylamine.

44. The process according to claim 41, wherein said tertiary amine is triethanolamine.

45. The process according to claim 41, wherein said heterocyclic amines are selected from the group consisting of: hexamethylenediamine, bis(aminopropyl) piperazine, and piperazine.

46. The process according to claim 40, wherein said polishing rate accelerator includes at least one quaternary amine.

47. The process according to claim 46, wherein said quaternary amine is selected from the group consisting of: tetramethylammonium chloride, tetraethylammonium chloride, tetrapropylammonium chloride, tetramethylammonium hydroxide, tetraethylammonium hydroxide, tetrapropylammonium hydroxide, alkylbenzyldimethylammonium chloride, and alkylbenzyldimethylammonium hydroxide, wherein the alkyl chain ranges from 1 to about 20 carbon atoms.

48. The process according to claim 40, wherein said polishing rate accelerator is selected from the group consisting of diethylenetriamine, triethylenetetramine, tetraethylenepentamine, and aminoethylethanolamine.

49. The process according to claim 40, further comprising either sodium chlorite or sodium hypochlorite in an amount between about 1 ppm to about 1000 ppm.

50. The process according to claim 49, wherein either the sodium chlorite or sodium hypochlorite are present in an amount between about 65 ppm to about 100 ppm.

51. The process according to claim 40 further comprising a fungicide in an amount between about 0.1 to about 2%.

52. The process according to claim 51, wherein said fungicide is present in an amount between about 0.1 to about 0.8%.

53. The process according to claim 52, wherein said fungicide is present in an amount between about 0.1 to about 0.5%.

54. The process according to claim 51, wherein said fungicide is sodium pyrithione.

* * * * *